(12) United States Patent
Matsumoto et al.

(10) Patent No.: US 8,722,269 B2
(45) Date of Patent: May 13, 2014

(54) FUEL CELL SYSTEM AND SCAVENGING METHOD THEREFOR

(75) Inventors: Yuji Matsumoto, Shioya-gun (JP); Koichiro Miyata, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 748 days.

(21) Appl. No.: 12/011,853

(22) Filed: Jan. 30, 2008

(65) Prior Publication Data

US 2008/0187791 A1    Aug. 7, 2008

(30) Foreign Application Priority Data

Feb. 1, 2007    (JP) ................................. 2007-023480

(51) Int. Cl.
*H01M 8/04*    (2006.01)
*H01M 8/02*    (2006.01)

(52) U.S. Cl.
USPC ........................... 429/444; 429/454; 429/512

(58) Field of Classification Search
USPC ............. 429/13, 19, 25, 38, 30, 22, 428, 429, 429/452, 502, 433, 443, 444, 454, 512, 513
See application file for complete search history.

(56) References Cited

U.S. PATENT DOCUMENTS

| | | | | |
|---|---|---|---|---|
| 5,646,852 A | * | 7/1997 | Lorenz et al. | 701/103 |
| 2005/0196654 A1 | * | 9/2005 | Inai et al. | 429/22 |
| 2005/0214605 A1 | * | 9/2005 | Saitoh et al. | 429/22 |
| 2006/0088742 A1 | * | 4/2006 | Kotani et al. | 429/13 |
| 2006/0115700 A1 | * | 6/2006 | Kotani et al. | 429/25 |
| 2006/0159966 A1 | * | 7/2006 | Wake et al. | 429/13 |

FOREIGN PATENT DOCUMENTS

| | | | | |
|---|---|---|---|---|
| JP | 2002-208422 | | 7/2002 | |
| JP | 2006134670 A | * | 5/2006 | .............. H01M 8/04 |
| JP | 2006-147346 | | 6/2006 | |
| JP | 2006-156180 | | 6/2006 | |

OTHER PUBLICATIONS

Machine Translation of: JP 2006134670 A, Uoshima et al., May 25, 2006.*
Japanese Office Action for Application No. 2007-023480, 5 pages, dated May 8, 2012.

\* cited by examiner

*Primary Examiner* — Kenneth Douyette
(74) *Attorney, Agent, or Firm* — Nelson Mullins Riley & Scarborough LLP; Anthony A. Laurentano

(57) ABSTRACT

A fuel cell system includes a scavenging gas supply device for supplying a scavenging gas to a fuel cell stack; a scavenging switching valve for performing switching between first scavenging for performing scavenging by supplying the scavenging gas to one of a cathode gas passage and an anode gas passage, and second scavenging for performing scavenging by supplying the scavenging gas to the other gas passage; a pressure control device for controlling the pressure of the scavenging gas; and a control part for controlling operations of the scavenging gas supply device, the scavenging switching valve, and the pressure control device. When the scavenging is switched from the first scavenging to the second scavenging via the scavenging switching valve, the pressure of the scavenging gas at the upstream side with respect to the scavenging switching valve becomes lower than the pressure of the scavenging gas during the first scavenging.

4 Claims, 12 Drawing Sheets

FUEL CELL SYSTEM AND SCAVENGING METHOD THEREFOR

BACKGROUND OF THE INVENTION

1. Field of the Invention

The present invention relates to a fuel cell system and a scavenging method thereof.

Priority is claimed on Japanese Patent Application No. 2007-023480, filed Feb. 1, 2007, the content of which is incorporated herein by reference.

2. Description of the Related Art

In a known fuel cell, an anode and a cathode are provided on either side of a solid polymer electrolyte membrane so as to form a membrane electrode assembly. The membrane electrode assembly is placed between a pair of separators, thereby forming a unit fuel cell (called a "unit cell" below) having a plate shape. Generally, a specific number of unit cells are stacked so as to form a fuel cell stack (called a "fuel cell" below).

In this fuel cell, a hydrogen gas is supplied between the anode and the corresponding separator, while air as an oxidant gas is supplied between the cathode and the corresponding separator. Accordingly, hydrogen ions generated at the anode by catalytic reaction move through the solid polymer electrolyte membrane to the cathode, and an electrochemical reaction occurs between the hydrogen ions and oxygen at the cathode, thereby generating electric power. In this process, water is generated in the fuel cell.

When the temperature of the fuel cell falls below the freezing point while the electric-power generation stops, water remaining in the fuel cell freezes. Accordingly, the function of the membrane electrode assembly is degraded, which also degrades starting (or activation) performance or power-generating performance of the fuel cell.

Japanese Unexamined Patent Application, First Publication No. 2002-208422 discloses a method of supplying a dry gas to at least one of an air passage and a hydrogen passage after the normal operation of the fuel cell is stopped; making the dry gas capture water in the fuel cell; and discharging the gas as a wet gas.

In a technique which has been proposed in recent years, air, which is supplied as a reaction gas to a cathode gas passage, is also supplied to an anode gas passage as a scavenging gas. In this case, a scavenging switching valve is provided for switching the target, to which air is supplied, between the cathode gas passage and the anode gas passage.

However, when the scavenging switching valve is switched so as to perform anode scavenging after completion of cathode scavenging, a pressure difference occurs between both sides of the scavenging switching valve. That is, the upstream side of the scavenging switching valve has a higher pressure while the downstream side thereof has a lower pressure. In this case, a large amount of power (or force) is required for opening the scavenging switching valve. If a scavenging switching valve having a large amount of opening and closing power is employed so that the valve can be opened against a large pressure difference, then the size of the scavenging switching valve is increased, thereby increasing the cost of the system.

SUMMARY OF THE INVENTION

In light of the above circumstances, an object of the present invention is to provide a fuel cell system and a scavenging method thereof, by which the force necessary for opening and closing a scavenging switching valve can be reduced, and the size and relevant cost of the scavenging switching valve can be reduced.

Therefore, the present invention provides a fuel cell system (e.g., a fuel cell system 101 in embodiments explained later) comprising:

a fuel cell stack (e.g., a fuel cell 1 in the embodiments) in which a cathode gas (e.g., an oxidant gas in the embodiments) and an anode gas (e.g., a fuel gas in the embodiments) are respectively supplied to a cathode gas passage (e.g., a cathode gas passage 52 in the embodiments) and an anode gas passage (e.g., an anode gas passage 51 in the embodiments) so as to generate electric power;

a scavenging gas supply device (e.g., a compressor 102 in the embodiments) for supplying a scavenging gas to the fuel cell stack;

a scavenging switching valve (e.g., a discharge valve 64 in the embodiments) for performing switching between first scavenging (e.g., cathode scavenging in the embodiments) for performing scavenging by supplying the scavenging gas to one of the cathode gas passage and the anode gas passage, and second scavenging (e.g., anode scavenging in the embodiments) for performing scavenging by supplying the scavenging gas to the other one of the cathode gas passage and the anode gas passage;

a scavenging gas pressure control device (e.g., a back pressure valve 104 in the embodiments) for controlling the pressure of the scavenging gas; and a control part (e.g., an ECU 60 in the embodiments) for controlling operations of the scavenging gas supply device, the scavenging switching valve, and the scavenging gas pressure control device, wherein the control part controls the pressure of the scavenging gas by using the scavenging gas pressure control device in such a manner that when the scavenging is switched from the first scavenging to the second scavenging via the scavenging switching valve, the pressure of the scavenging gas at the upstream side with respect to the scavenging switching valve becomes lower than the pressure of the scavenging gas during the first scavenging.

In accordance with the above structure, when the scavenging is switched from the first scavenging to the second scavenging, the pressure of the scavenging gas at the upstream side with respect to the scavenging switching valve is reduced, thereby reducing the pressure difference between the two sides of the scavenging switching valve. Therefore, the force necessary for opening the scavenging switching valve can be reduced, thereby reducing the size and cost of the scavenging switching valve.

In a typical example, the first scavenging is cathode scavenging performed by supplying the scavenging gas to the cathode gas passage, and the second scavenging is pressure scavenging performed by supplying the scavenging gas to the anode gas passage. In this case, the scavenging switching valve may be a discharge valve (e.g., the discharge valve 64 in the embodiments) for controlling discharge of the scavenging gas from the anode gas passage.

Accordingly, when the discharge valve provided on the downstream side of the anode gas passage functions as the scavenging switching valve, the anode gas passage communicates with the cathode gas passage even during the cathode scavenging. Therefore, the scavenging gas supplied during the cathode scavenging can be drawn into the anode gas passage, so as to dilute the anode gas remaining in the anode gas passage. Accordingly, it is possible to reduce the concentration of the anode gas included in the discharge gas during the anode scavenging.

In addition, the scavenging gas pressure control device may be a back pressure valve (e.g., the back pressure valve 104 in the embodiments) by which the scavenging gas discharged from the cathode gas passage can be controlled.

When using the compressor as the scavenging gas pressure control device, the pressure control is performed by varying the rotation speed, which may make the user feel uncomfortable due to a variation in the noise which is generated during the scavenging. In contrast, in accordance with the above structure in which the back pressure valve is used as the scavenging gas pressure control device, it is possible to reduce user discomfort caused by variation in the noise generated during the scavenging.

In a preferable example, pressure difference between the upstream and downstream sides with respect to the scavenging switching valve is measured, and when the scavenging is switched from the first scavenging to the second scavenging, the pressure of the scavenging gas is reduced until the measured pressure difference becomes lower than a predetermined value.

In another preferable example, when the scavenging is switched from the first scavenging to the second scavenging, the pressure of the scavenging gas is reduced until a predetermined time has elapsed.

In another preferable example, the scavenging gas pressure control device is a compressor (e.g., the compressor 102 in the embodiments) whose rotation speed is variable.

The present invention also provides a fuel cell system comprising:

a fuel cell stack in which a cathode gas and an anode gas are respectively supplied to a cathode gas passage and an anode gas passage so as to generate electric power;

a scavenging gas supply device for supplying a scavenging gas to the fuel cell stack;

an anode scavenging gas passage (e.g., an anode scavenging gas passage 65 in the embodiments) through which the scavenging gas for scavenging the anode gas passage flows;

an anode scavenging control valve (e.g., the discharge valve 64 in the embodiments), which is provided at the anode scavenging gas passage, and opened when scavenging of the anode gas passage is started;

a scavenging gas pressure control device for controlling the pressure of the scavenging gas; and a control part for controlling operations of the scavenging gas supply device, the anode scavenging control valve, and the scavenging gas pressure control device, wherein the control part controls the pressure of the scavenging gas by using the scavenging gas pressure control device in such a manner that when the anode scavenging control valve is opened, the pressure of the scavenging gas at the upstream side with respect to the anode scavenging control valve becomes lower than the pressure of the scavenging gas during the scavenging of the anode gas passage.

In accordance with the above structure, when starting the anode scavenging, the pressure of the scavenging gas at the upstream side with respect to the anode scavenging control valve is reduced, thereby reducing the pressure difference between the two sides of the anode scavenging control valve. Therefore, the force necessary for opening the anode scavenging control valve can be reduced, thereby reducing the size and cost of the anode scavenging control valve.

In a typical example:

the anode scavenging control valve is a discharge valve for controlling discharge of the scavenging gas from the anode gas passage; and the control part opens the discharge valve after storing the scavenging gas at the upstream side with respect to the anode scavenging control valve, by using the scavenging gas supply device.

Accordingly, when the discharge valve provided on the downstream side of the anode gas passage functions as the anode scavenging control valve, the anode gas passage communicates with the cathode gas passage even during the cathode scavenging. Therefore, the scavenging gas supplied during the cathode scavenging can be drawn into the anode gas passage, so as to dilute the anode gas remaining in the anode gas passage. Accordingly, it is possible to reduce the concentration of the anode gas included in the discharge gas during the anode scavenging.

In a preferable example, pressure difference between the upstream and downstream sides with respect to the anode scavenging control valve is measured, and when the anode scavenging control valve is opened, the pressure of the scavenging gas is reduced until the measured pressure difference becomes lower than a predetermined value.

In another preferable example, when the anode scavenging control valve is opened, the pressure of the scavenging gas is reduced until a predetermined time has elapsed.

The present invention also provides a scavenging method of a fuel cell system, wherein:

the fuel cell system includes:

a fuel cell stack in which a cathode gas and an anode gas are respectively supplied to a cathode gas passage and an anode gas passage so as to generate electric power;

a scavenging gas supply device for supplying a scavenging gas to the fuel cell stack; and a scavenging switching valve for performing switching between first scavenging for performing scavenging by supplying the scavenging gas to one of the cathode gas passage and the anode gas passage, and second scavenging for performing scavenging by supplying the scavenging gas to the other one of the cathode gas passage and the anode gas passage; and the method comprises the steps of:

performing the first scavenging (e.g., refer to step S24 in the embodiments);

controlling the pressure of the scavenging gas by making the pressure of the scavenging gas at the upstream side with respect to the scavenging switching valve be lower than the pressure of the scavenging gas during the first scavenging (e.g., refer to step S36 in the embodiments); and switching the scavenging switching valve (e.g., refer to step S40 in the embodiments).

In accordance with the above method, after the first scavenging has been completed, the pressure of the scavenging gas at the upstream side with respect to the scavenging switching valve is reduced before switching the scavenging switching valve. Therefore, the pressure difference between the two sides of the scavenging switching valve is reduced, and thus the force necessary for opening the scavenging switching valve can be reduced, thereby reducing the size and cost of the scavenging switching valve.

In a preferable example, the scavenging method further comprises the step of:

measuring pressure difference between the upstream and downstream sides with respect to the scavenging switching valve, wherein:

the step of controlling the pressure of the scavenging gas includes reducing the pressure of the scavenging gas until the measured pressure difference becomes lower than a predetermined value.

In another preferable example, the step of controlling the pressure of the scavenging gas includes reducing the pressure of the scavenging gas until a predetermined time has elapsed.

DETAILED DESCRIPTION OF THE INVENTION

Hereinafter, embodiments in accordance with the present invention will be described with reference to the appended figures.

First, the general structure of a fuel cell system will be explained. The fuel cell system has a fuel cell stack in which a number of unit fuel cells (called "unit cells" below) are stacked and electrically connected in series, and they are interposed between endplates. These elements of the stack are fastened using tie rods.

Fuel Cell

Figure 1:
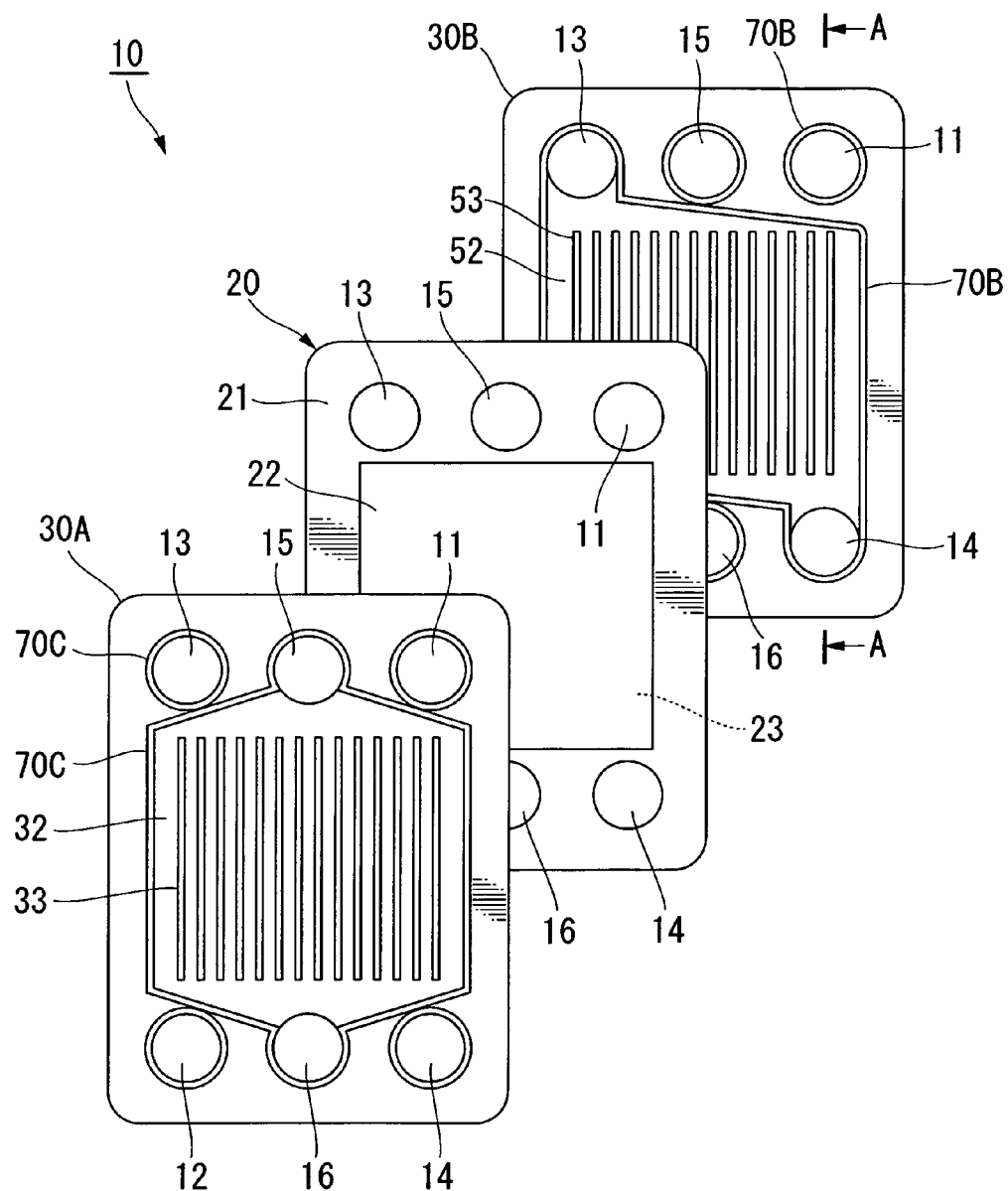
FIG. 1 is a development showing a unit cell.

FIG. 1 is a development showing a unit cell. A unit cell 10 has a sandwich structure in which separators 30A and 30B interpose a membrane electrode assembly 20. In more detail, the membrane electrode assembly 20 is formed by providing an anode (electrode) 22 and a cathode (electrode) 23 on either side of a solid polymer electrolyte membrane 21, which may be made of a fluorine electrolyte material. The separator 30A function as an anode separator which faces the anode 22, and the separator 30B functions as a cathode separator which faces the cathode 22. The separators 30A and 30B may be made of a carbon material.

In FIG. 1, fuel gas supply holes 11, through which an unused fuel gas (i.e., an anode gas, e.g., a hydrogen gas) flows, are provided at upper right corners of the membrane electrode assembly 20 and both separators 30A and 30B. At lower left corners (i.e., diagonally opposite corners), anode off-gas discharge holes 12, through which a spent fuel gas (called an "anode off-gas" below) flows, are provided.

In addition, oxidant gas supply holes 13, through which an unused oxidant gas (i.e., a cathode gas, e.g., air) flows, are provided at upper left corners of the membrane electrode assembly 20 and both separators 30A and 30B. At lower right corners (i.e., diagonally opposite corners), cathode off-gas discharge holes 14, through which a spent oxidant gas (called a "cathode off-gas" below) flows, are provided.

Additionally, refrigerant supply holes 15, through which an unused refrigerant flows, are provided at each upper center of the membrane electrode assembly 20 and both separators 30A and 30B. At each lower center (i.e., symmetrically opposite center), refrigerant discharge holes 16, through which a spent refrigerant flows, are provided.

At the cathode separator 30B, in a surface which faces the membrane electrode assembly 20, a recessed part (see reference numeral 52), having a substantially rectangular form in plan view, is provided for making an oxidant gas flow along the membrane electrode assembly 20. The recessed part is connected to the relevant oxidant gas supply hole 13 and cathode off-gas discharge hole 14, thereby forming a cathode gas passage 52.

In the cathode gas passage 52, a plurality of guide protruding lines 53 are provided in parallel, so as to guide the oxidant gas to flow from the upper side to the lower side.

At the cathode separator 30B, the surface opposite to the membrane electrode assembly 20 is flat.

Also at the cathode separator 30B, in the surface which faces the membrane electrode assembly 20, seal members 70B are provided, each being integrally molded using silicon rubber, fluorine rubber, ethylene-propylene rubber, butyl rubber, or the like. One of the seal members 70B makes a circuit of and thus surrounds the outside of the relevant oxidant gas supply hole 13, the cathode gas passage 52, and the relevant cathode off-gas discharge hole 14. The other seal members 70B individually surround the fuel gas supply hole 11, the anode off-gas discharge hole 12, the refrigerant supply hole 15, and the refrigerant discharge hole 16.

Although it is not shown, at the anode separator 30A, in a surface which faces the membrane electrode assembly 20, a recessed part, having a substantially rectangular form in plan view, is provided for making a fuel gas flow along the membrane electrode assembly 20. This recessed part is connected to the fuel gas supply hole 11 and the anode off-gas discharge hole 12, thereby forming an anode gas passage 51.

Also at the anode separator 30A, in the surface which faces the membrane electrode assembly 20, seal members 70A are provided. One of the seal members 70A makes a circuit of and thus surrounds the outside of the relevant fuel gas supply hole 11, the anode gas passage 51, and the relevant anode off-gas discharge hole 12. The other seal members 70A individually surround the oxidant gas supply hole 13, the cathode off-gas discharge hole 14, the refrigerant supply hole 15, and the refrigerant discharge hole 16.

At the cathode separator 30A, in the surface opposite to the membrane electrode assembly 20, a recessed part (which forms a refrigerant passage 32), having a substantially rectangular form in plan view, is provided for circulating a refrigerant. The recessed part is connected to the refrigerant supply hole 15 and the refrigerant discharge hole 16, thereby forming the refrigerant passage 32. In the refrigerant passage 32, a plurality of guide protruding lines 33 are provided in parallel, so as to guide the refrigerant to flow from the upper side to the lower side.

Also in this surface opposite to the membrane electrode assembly 20, seal members 70C are provided. One of the seal members 70C makes a circuit of and thus surrounds the outside of the refrigerant supply hole 15, the refrigerant passage 32, and the refrigerant discharge hole 16. The other seal members 70C individually surround the fuel gas supply hole 11, the anode off-gas discharge hole 12, the oxidant gas supply hole 13, and the cathode off-gas discharge hole 14.

Figure 2:
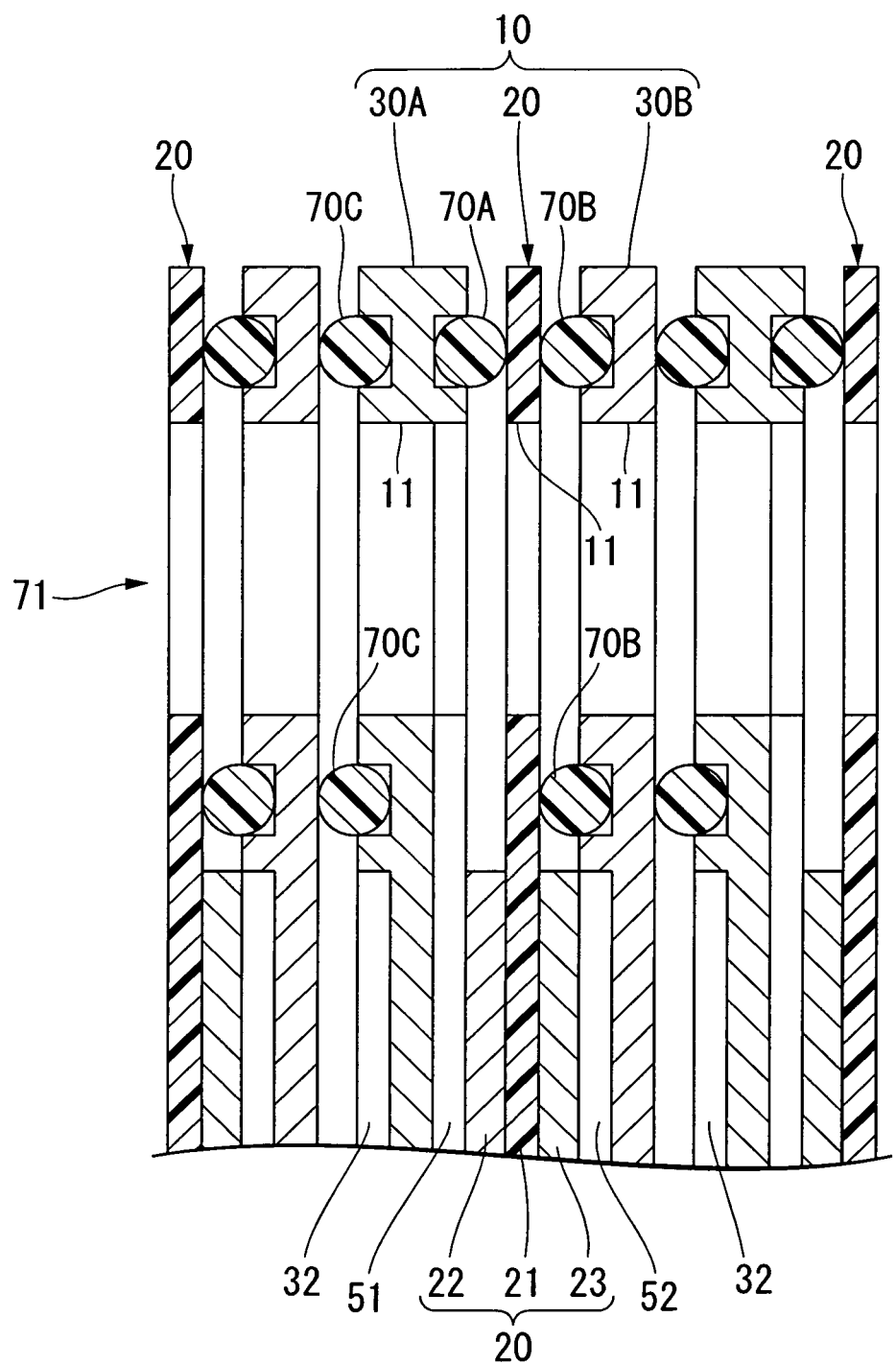
FIG. 2 is a side sectional view along line A-A in FIG. 1, so as to show a fuel cell stack formed by stacking the unit cells.

FIG. 2 shows a fuel cell stack formed by stacking the unit cells, and is a side sectional view along line A-A in FIG. 1. As shown in FIG. 2, the cathode separator 30B closely contacts the membrane electrode assembly 20 via the seal members 70B, and the anode separator 30A closely contacts the membrane electrode assembly 20 via the seal members 70A. Accordingly, the cathode gas passage 52 is formed between the cathode separator 30B and the membrane electrode assembly 20, and the anode gas passage 51 is formed between the anode separator 30A and the membrane electrode assembly 20.

In addition, the anode separator 30A also closely contacts the adjacent cathode separator 30B via the seal members 70C. Accordingly, the refrigerant passage 32 is formed between both separators 30A and 30B.

When a hydrogen gas is supplied as a fuel gas to the anode gas passage 51, and air (which includes oxygen) is supplied as an oxidant gas to the cathode gas passage 52, hydrogen ions generated at the anode 22 by catalytic reaction move through the solid polymer electrolyte membrane 21 to the cathode 23, and an electrochemical reaction occurs between the hydrogen ions and oxygen at the cathode 23, thereby generating electric power and water. As a part of water generated at the cathode 23 diffuses toward the anode 22, the generated water is also present at the anode 22.

On the other hand, the fuel gas supply holes 11 formed in the membrane electrode assembly 20 and both separators 30A and 30B are coupled together, thereby forming a fuel gas supply communication passage 71, which is coupled with the anode gas passage 51 of each unit cell.

Similarly, the anode off-gas discharge holes 12 formed in each unit cell are coupled together, thereby forming an anode off-gas discharge communication passage. Also similarly, the oxidant gas supply holes 13 are coupled together, thereby forming an oxidant gas supply communication passage, and the cathode off-gas discharge holes 14 are coupled together, thereby forming a cathode off-gas discharge communication passage. Furthermore, the refrigerant supply holes 15 are coupled together, thereby forming a refrigerant supply communication passage, and the refrigerant discharge holes 16 are coupled together, thereby forming a refrigerant discharge communication passage.

Fuel Cell System

Figure 3:
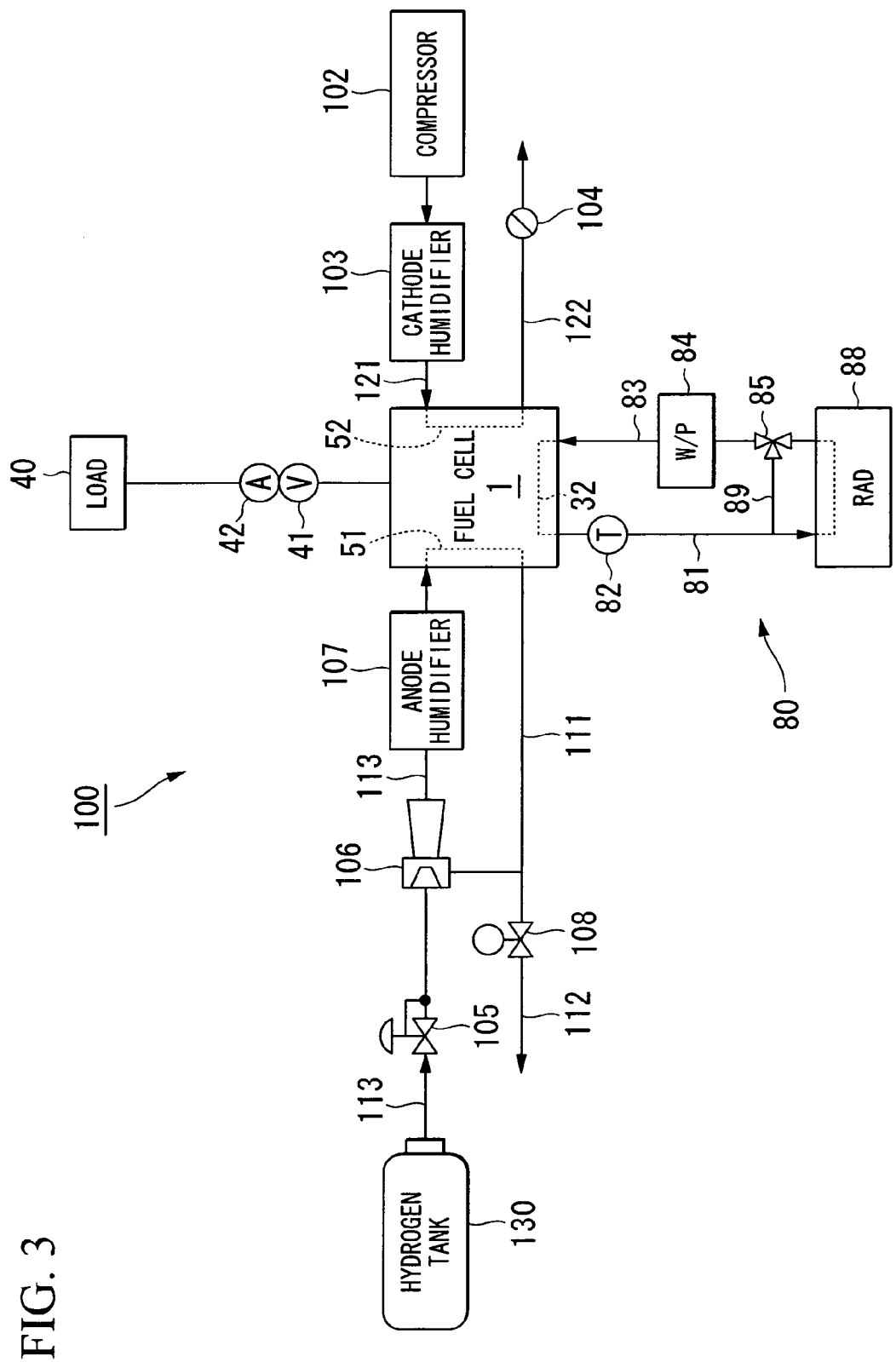
FIG. 3 is a diagram showing the general structure of a fuel cell system, which includes a fuel cell stack.

FIG. 3 is a diagram showing the general structure of a fuel cell system, which includes a fuel cell stack. A fuel cell stack 1 (called a "fuel cell" or FC, below) having the above-described structure performs electric power generation by means of an electrochemical reaction between a fuel gas (e.g., hydrogen gas) and an oxidant gas (e.g., air). Therefore, a fuel gas supply piping 113 is joined to the fuel gas supply communication passage of the fuel cell 1, and a hydrogen tank 130 is connected to the upstream end of the piping. In addition, an oxidant gas supply piping 121 is joined to the oxidant gas supply communication passage of the fuel cell 1, and a compressor 102 (i.e., an air pump) is connected as a reaction gas supply device to the upstream end of the piping. Furthermore, an anode off-gas collection piping 111 is joined to the anode off-gas discharge communication passage of the fuel cell 1, and a cathode off-gas discharge piping 122 is joined to the cathode off-gas discharge communication passage of the fuel cell 1.

The hydrogen gas supplied from the hydrogen tank 130 to the fuel gas supply piping 113 is decompressed by a regulator 105, and then passes through an ejector 106. This gas is humidified by an anode humidifier 107, and is supplied to the anode gas passage 51 of the fuel cell 1. The anode off-gas flows through the anode off-gas collection piping 111, and is then absorbed by the ejector 106. Accordingly, the absorbed gas mixes with the hydrogen gas supplied to the hydrogen tank 130, and is again supplied to the fuel cell 1, thereby making the gas circulate. The anode off-gas collection piping 111 is connected to an anode off-gas discharge piping 112 via an electromagnetically-driven purge valve 108.

On the other hand, air is compressed by the compressor 102, and humidified in a cathode humidifier 103. The humidified gas is supplied to the cathode gas passage 52 of the fuel cell 1. After oxygen in the supplied air is used as an oxidant for electric power generation, the gas is discharged as the cathode off-gas from the fuel cell 1 via a back pressure valve 104 toward the atmosphere.

A fuel cell system 100 has a cooling device 80 for cooling the fuel cell 1 by circulating a refrigerant inside the fuel cell 1. In order to form the cooling device 80, a refrigerant supply piping 83 is joined to the refrigerant supply communication passage of the fuel cell 1, and a refrigerant discharge piping 81 is joined to the refrigerant discharge communication passage. The upstream end of the refrigerant supply piping 83 and the downstream end of the refrigerant discharge piping 81 are connected to a radiator 88 (i.e., heat exchanger). At the refrigerant supply piping 83, a water pump (W/P) 84 is provided as a refrigerant supply device for circulating the refrigerant between the fuel cell 1 and the radiator 88. The W/P 84 is coupled coaxially with the compressor 102, so that it is driven along with the compressor 102. At the refrigerant discharge piping 81, a refrigerant temperature sensor 82 is provided for measuring the temperature of the refrigerant (i.e., refrigerant temperature) after the fuel cell 1 is cooled. As the refrigerant temperature after the fuel cell 1 is cooled substantially coincides with the temperature of the fuel cell 1, the refrigerant temperature sensor 82 functions as a fuel cell temperature evaluating device.

To the fuel cell 1, a load 40 such as a motor is connected and is driven by the fuel cell 1. In order to measure a voltage or an electric current output from the fuel cell 1 to the load 40, a voltage sensor 41 and a current sensor 42 are provided.

First Embodiment

Figure 4:
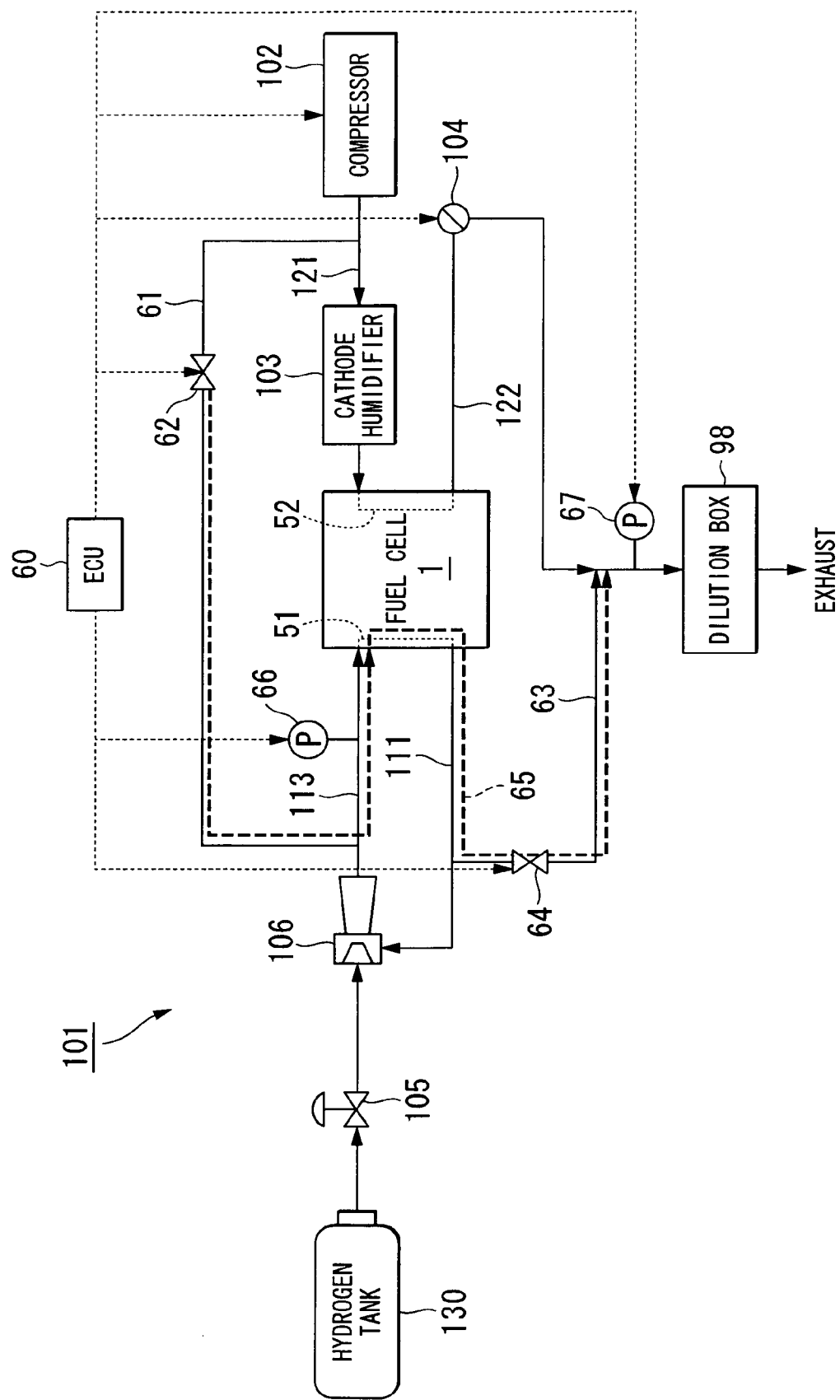
FIG. 4 is a diagram showing distinctive features in the structure of a fuel cell system as a first embodiment in accordance with the present invention.

FIG. 4 is a diagram showing distinctive features in the structure of a fuel cell system as a first embodiment in accordance with the present invention. That is, a fuel cell system 101 of the first embodiment has the distinctive features shown in FIG. 4, in addition to the general structure of the fuel cell system 100 shown in FIG. 3. Other embodiments or variations explained later also have individual distinctive features in addition to the general structure of the fuel cell system 100 shown in FIG. 3.

The fuel cell system 101 of the first embodiment can perform a scavenging operation by supplying a scavenging gas to the cathode gas passage 52 and the anode gas passage 51, and discharging the water remaining in each passage to the outside of the fuel cell 1. More specifically, either the first scavenging for supplying the scavenging gas to the cathode gas passage 52 or the second scavenging for supplying the scavenging gas to the anode gas passage 51 can be switchably executed. As the scavenging gas, air, which is a reaction gas (i.e., oxidant gas) of the fuel cell 1, is used. Therefore, the above-described compressor 102 functions as a scavenging gas supply device for supplying the scavenging gas to the fuel cell 1.

The fuel cell system 101 has a cathode scavenging gas passage through which a scavenging gas for scavenging the cathode gas passage 52 passes, and an anode scavenging gas passage 65 through which a scavenging gas for scavenging the anode gas passage 51 passes.

The cathode scavenging gas passage is formed by the oxidant gas supply piping 121, the cathode gas passage 52, and the cathode off-gas discharge piping 122. The back pressure valve 104, provided at the cathode off-gas discharge piping 122, may be a flow control valve whose degree of opening can be controlled, and functions as a scavenging gas pressure control device for controlling the pressure of the scavenging gas. The compressor 102 also can control the pressure of the scavenging gas by varying the rotation speed, and thus can function as a scavenging gas pressure control device.

The anode scavenging gas passage 65 is formed by the fuel gas supply piping 113, the anode gas passage 51, the anode off-gas collection piping 111, a scavenging gas supply passage 61 and a scavenging gas discharge passage 63.

The scavenging gas supply passage 61 branches off from the oxidant gas supply piping 121 at the upstream side of the humidifier 103, and joins the fuel gas supply piping 113 at the downstream side of the ejector 106 (and the humidifier 107).

The scavenging gas discharge passage 63 branches off from the anode off-gas collection piping 111, and is connected to a dilution box 98. The dilution box 98 dilutes an anode off-gas or anode scavenging gas, which includes unused hydrogen gas, by using a dilution gas such as a cathode off-gas.

At the scavenging gas discharge passage 63, a discharge valve 64 is provided for controlling the discharge of the scavenging gas from the anode gas passage 51. When the discharge valve 64 is opened, air is supplied from the compressor 102 to the anode gas passage 51, so that scavenging of the anode gas passage 51 (i.e., the second scavenging) can be performed. Therefore, the discharge valve 64 functions as an anode scavenging control valve. In contrast, when the discharge valve 64 is closed, air is supplied from the compressor 102 to the cathode gas passage 52, so that a scavenging of the cathode gas passage 52 (i.e., the first scavenging) can be performed. Therefore, the discharge valve 64 also functions as a scavenging switching valve for performing switching between the first scavenging and the second scavenging.

Instead of the discharge valve 64, or together with this valve, a draw valve 62 may be provided. Similar to the discharge valve 64, the draw valve 62 functions as the anode scavenging control valve and the scavenging switching valve.

Figure 5A:
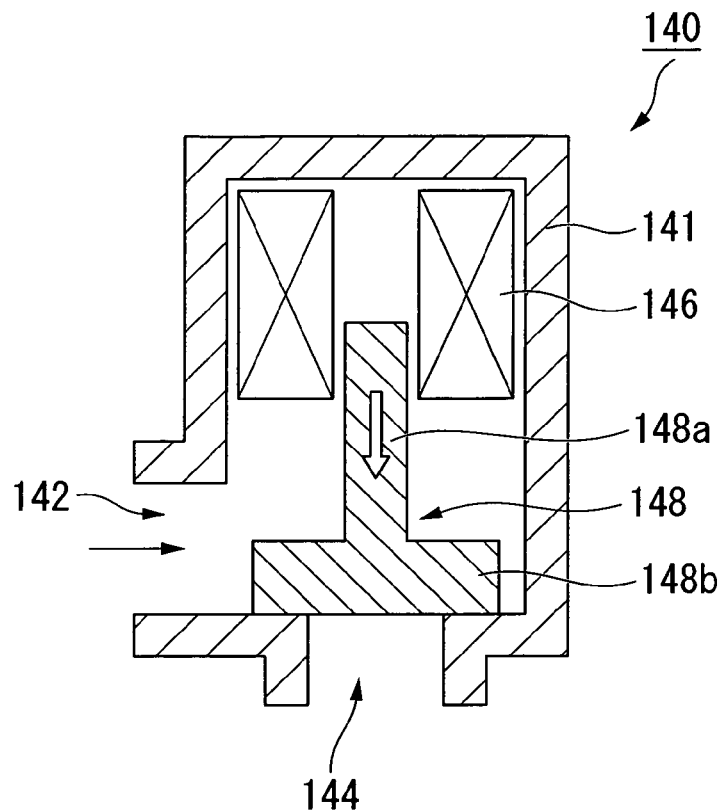
FIGS. 5A and 5B are sectional views showing an electromagnetic switching valve.
Figure 5B:
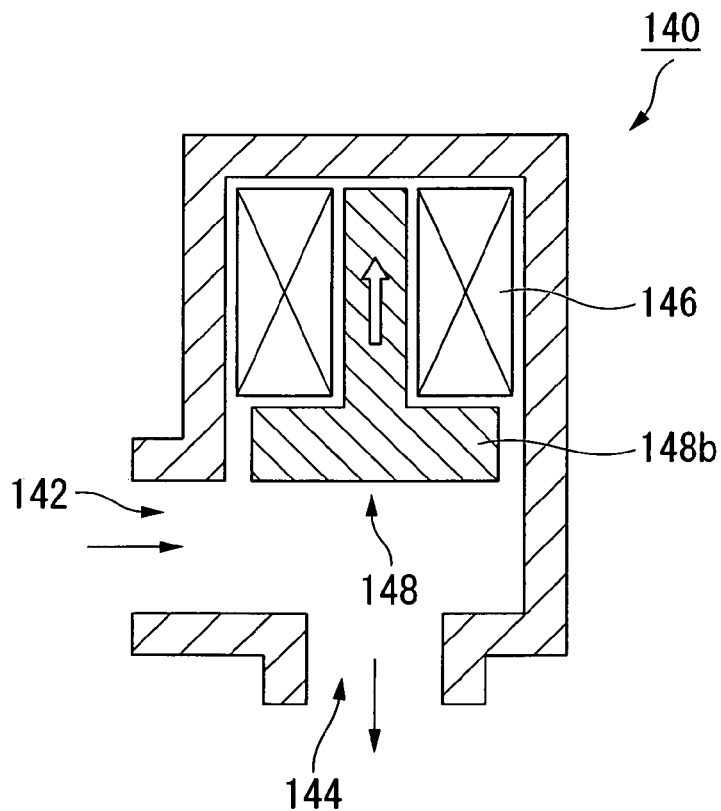

FIGS. 5A and 5B are sectional views showing an electromagnetic switching valve. The above-described discharge valve 64 (and the draw valve 62) is formed as an electromagnetic switching valve 140 shown in FIG. 5A. The electromagnetic switching valve 140 has a cylindrical case 141. In the side face of the case 141, a gas inlet 142 is open, and a gas outlet 144 is open in the bottom face thereof. A ring-form solenoid 146 is provided in the case 141. A shaft part 148a of a plunger 148 is inserted into the center hole of the solenoid 146. At the lower end of the shaft part 148a, a seal part 148b is formed, which can close the gas outlet 144.

As shown in FIG. 5A, when the solenoid 146 is not energized, the gas outlet 144 is closed by the seal part 148b of the plunger 148. In this case, the gas drawn through the gas inlet 142 is blocked by the electromagnetic switching valve 140, so that it does not flow out from the gas outlet 144. When the solenoid 146 is energized, as shown in FIG. 5B, the plunger 148 is pulled up, so that the gas outlet 144 is open. In this case, the gas drawn through the gas inlet 142 passes through the electromagnetic switching valve 140, and then flows out from the gas outlet 144. As such, an electromagnetic switching valve 140 is provided at the scavenging gas discharge passage 63, so that the passage can be opened or closed.

Returning to FIG. 4, a first pressure sensor 66 is provided at the downstream side of the fuel gas supply piping 113 with respect to the junction between the piping 113 and the scavenging gas supply passage 61. The first pressure sensor 66 measures the pressure of the scavenging gas on the upstream side with respect to the discharge valve 64 along the anode scavenging gas passage 65.

A second pressure sensor 67 is provided at the downstream end of the scavenging gas discharge passage 63. This sensor 67 measures the pressure of the scavenging gas on the downstream side with respect to the discharge valve 64 along the anode scavenging gas passage 65.

The fuel cell system 101 also has an electronic control unit 60 (i.e., control part called "ECU" below). The ECU 60 is connected to the compressor 102, the discharge valve 64, the draw valve 62, the first pressure sensor 66, and the second pressure sensor 67. Accordingly, the ECU 60 can control the operations of the compressor 102 as the scavenging gas supply device, the back pressure valve 104 as the scavenging gas pressure control device, and the discharge valve 64 (and the draw valve 62) as the scavenging switching valve. In addition, the ECU 60 measures pressure difference between both sides of the discharge valve 64 in accordance with measurement results of the first pressure sensor 66 and the second pressure sensor 67, and can control the operation of the back pressure valve 104 as the scavenging gas pressure control device, based on the measured pressure difference.

Scavenging Method of Fuel Cell System

Below, the scavenging method performed in the fuel cell system in the first embodiment will be explained.

Figure 7:
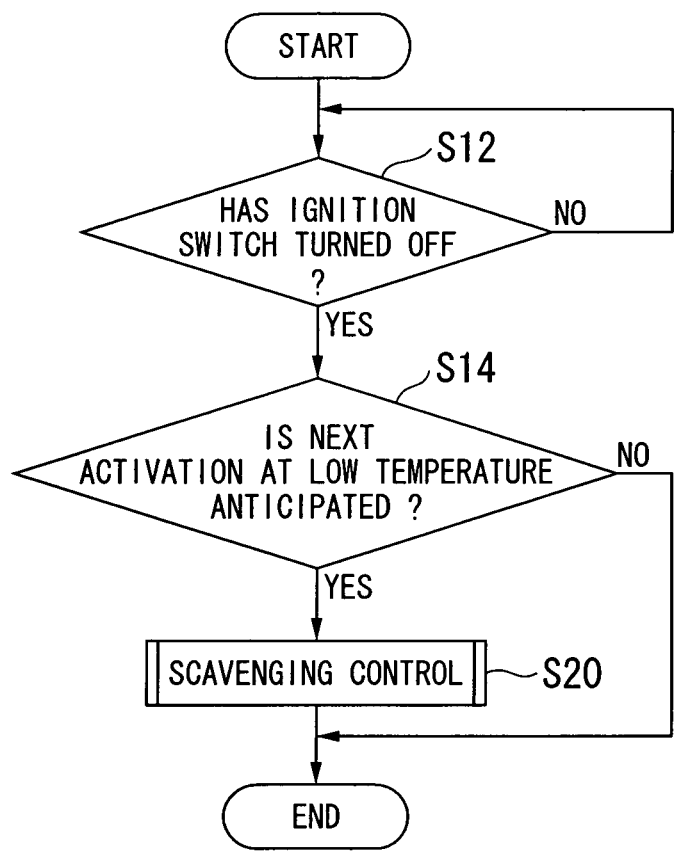
FIG. 7 is a flowchart of the scavenging method performed in the fuel cell system in the first embodiment.

FIG. 7 is a flowchart of this method. In the first step S12, it is determined whether the ignition switch of the relevant vehicle has been turned off. When the result of the determination is "YES", the operation proceeds to step S14, where it is determined whether or not it is anticipated that the next activation of the fuel cell 1 is performed in a low temperature atmosphere. This determination is performed based on the outside temperature, weather forecast, or the like. When the result of the determination step S14 is "NO" (i.e., low-temperature activation is not anticipated), there is no possibility of the water remaining in the fuel cell freezing. Therefore, no scavenging is performed, and the operation of the present flow is terminated. When the result of the determination in step S14 is "YES" (i.e., low-temperature activation is anticipated), the operation proceeds to step S20 so as to perform scavenging control.

Figure 6:
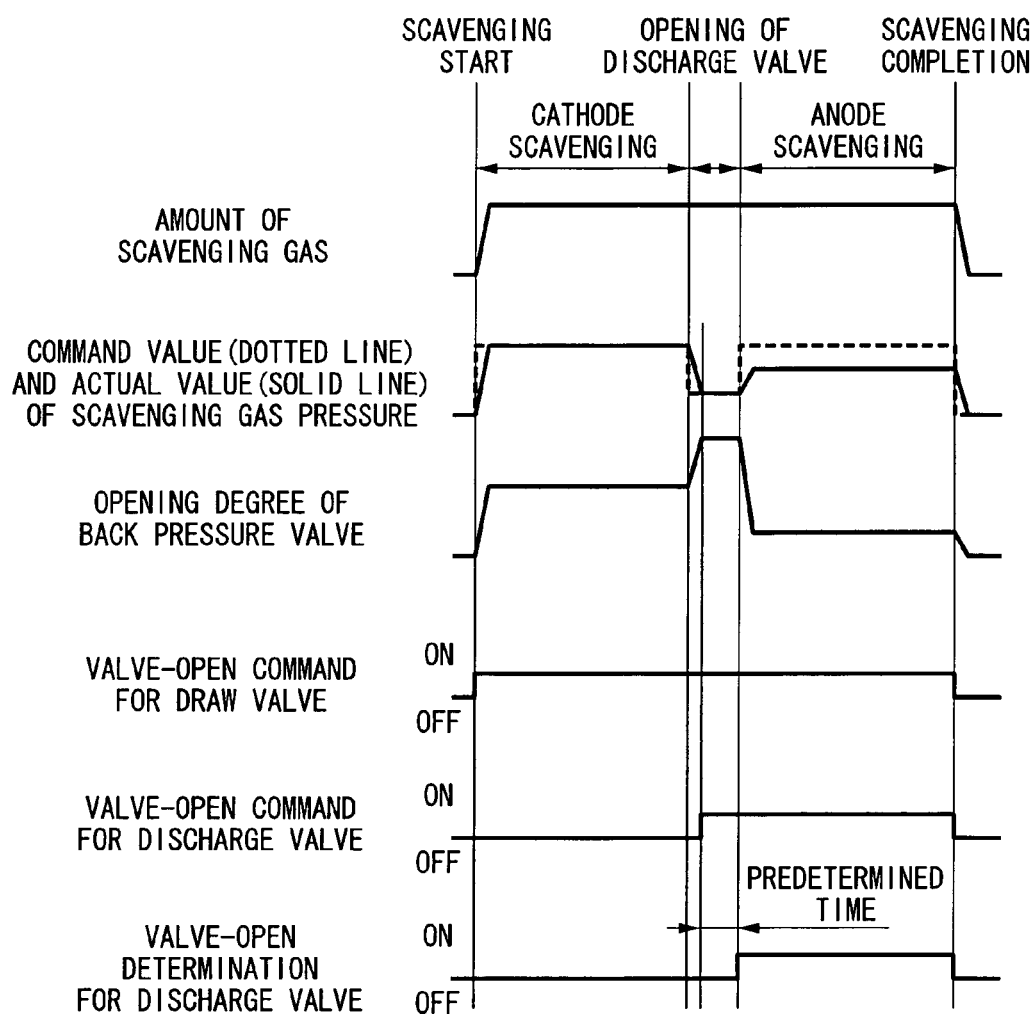
FIG. 6 is a timing chart with respect to the scavenging method of the fuel cell system in the first embodiment.

FIG. 6 is a timing chart with respect to the scavenging method of the fuel cell system in the first embodiment. In scavenging procedure, first, the scavenging gas is supplied to the cathode gas passage 52 so as to scavenge the cathode, and then the discharge valve 64 is opened. Next, the scavenging gas is supplied to the anode gas passage 51 so as to scavenge the anode.

Figure 8:
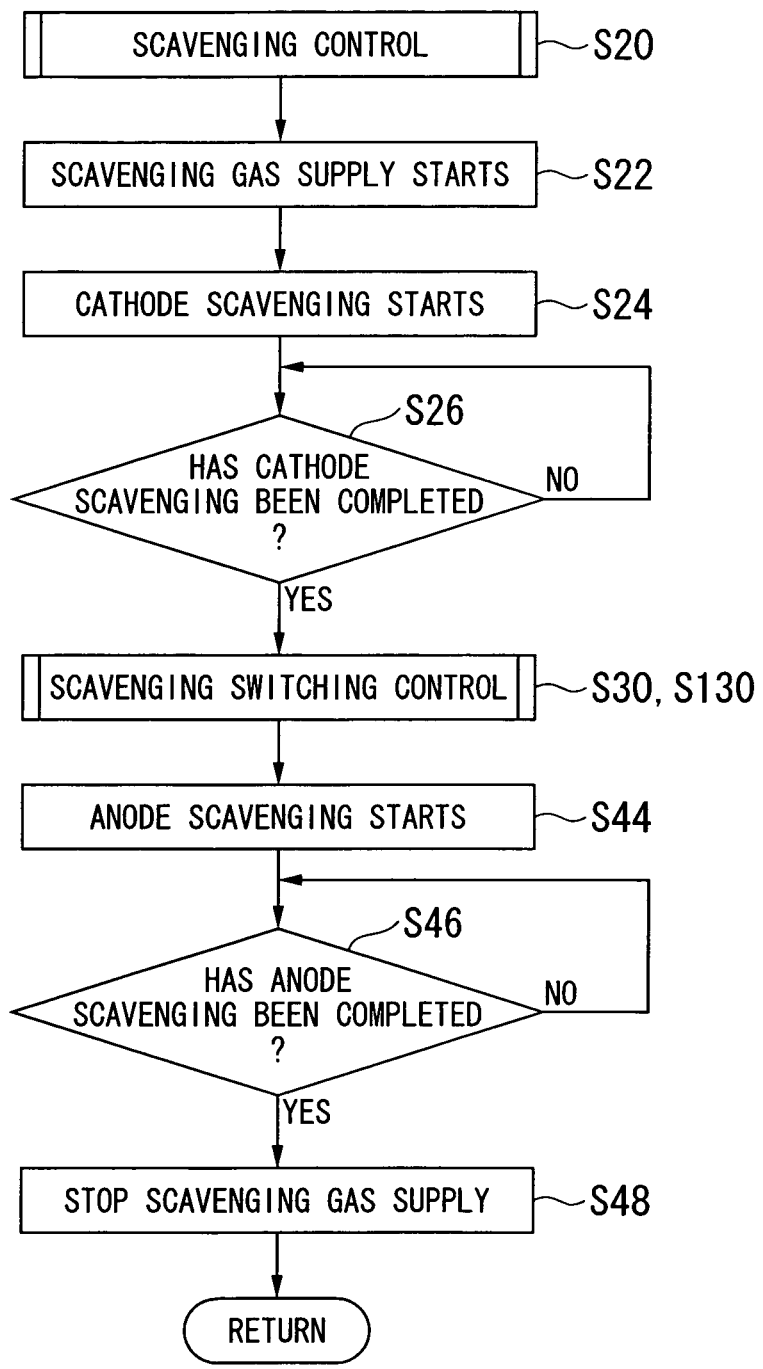
FIG. 8 is a flowchart of the scavenging control subroutine.

FIG. 8 is a flowchart of the scavenging control subroutine. In the first step S22, supply of the scavenging gas is started, and in the next step S24, scavenging of the cathode is started. More specifically, first, the compressor 102 is driven in accordance with a command from the ECU 60, so as to supply air as the scavenging gas. In addition, as shown in FIG. 6, the degree of opening of the back pressure valve 104 (as the scavenging gas pressure control device) is increased so as to increase the pressure of the scavenging gas to a specific command value. Accordingly, the scavenging gas having a predetermined pressure flows through the cathode scavenging gas passage (i.e., the oxidant gas supply piping 121, the cathode gas passage 52, and the cathode off-gas discharge piping 122) so that the cathode is scavenged. In the cathode scavenging, the remaining water in the cathode gas passage 52 is discharged together with the scavenging gas.

As shown in FIG. 6, as no valve-open command (for opening the relevant valve) is issued to the discharge valve 64 as the anode scavenging control valve (i.e., scavenging switching valve), valve-open determination with respect to the discharge valve 64 is in an off-state (i.e., it is not determined that the valve should be opened). Therefore, the anode is not scavenged. However, as a valve-open command is issued to the draw valve 62, the anode gas passage 51 communicates with the cathode gas passage 52 via the scavenging gas supply passage 61. Therefore, when the cathode is scavenged, the scavenging gas supplied to the cathode gas passage 52 can be drawn into the anode gas passage 51 so as to dilate the hydrogen gas remaining in the anode gas passage 51. Therefore, it is possible to reduce the concentration of the anode gas included in the gas discharged during the anode scavenging (as explained later).

Returning to FIG. 8, in step S26, it is determined whether or not the cathode scavenging has been completed. Here, it is determined that the cathode scavenging has been completed when the process of discharging the remaining water in the cathode gas passage 52 and the process of dilating the hydrogen gas in the anode gas passage 51 have been completed. More specifically, it is determined whether or not the cathode scavenging time (i.e., the time period during which the cathode has been scavenged) or the accumulated value of the amount of the scavenging gas exceeds a predetermined value, which is required for the completion of both processes. When the result of the determination in step S26 is "NO" (i.e., the cathode scavenging has not been completed), the cathode scavenging is continued. When the result of the determination in step S26 is "YES" (i.e., the cathode scavenging has been completed), the operation proceeds to step S30, where scavenging switching control (i.e., opening of the discharge valve 64) is performed.

Figure 9:
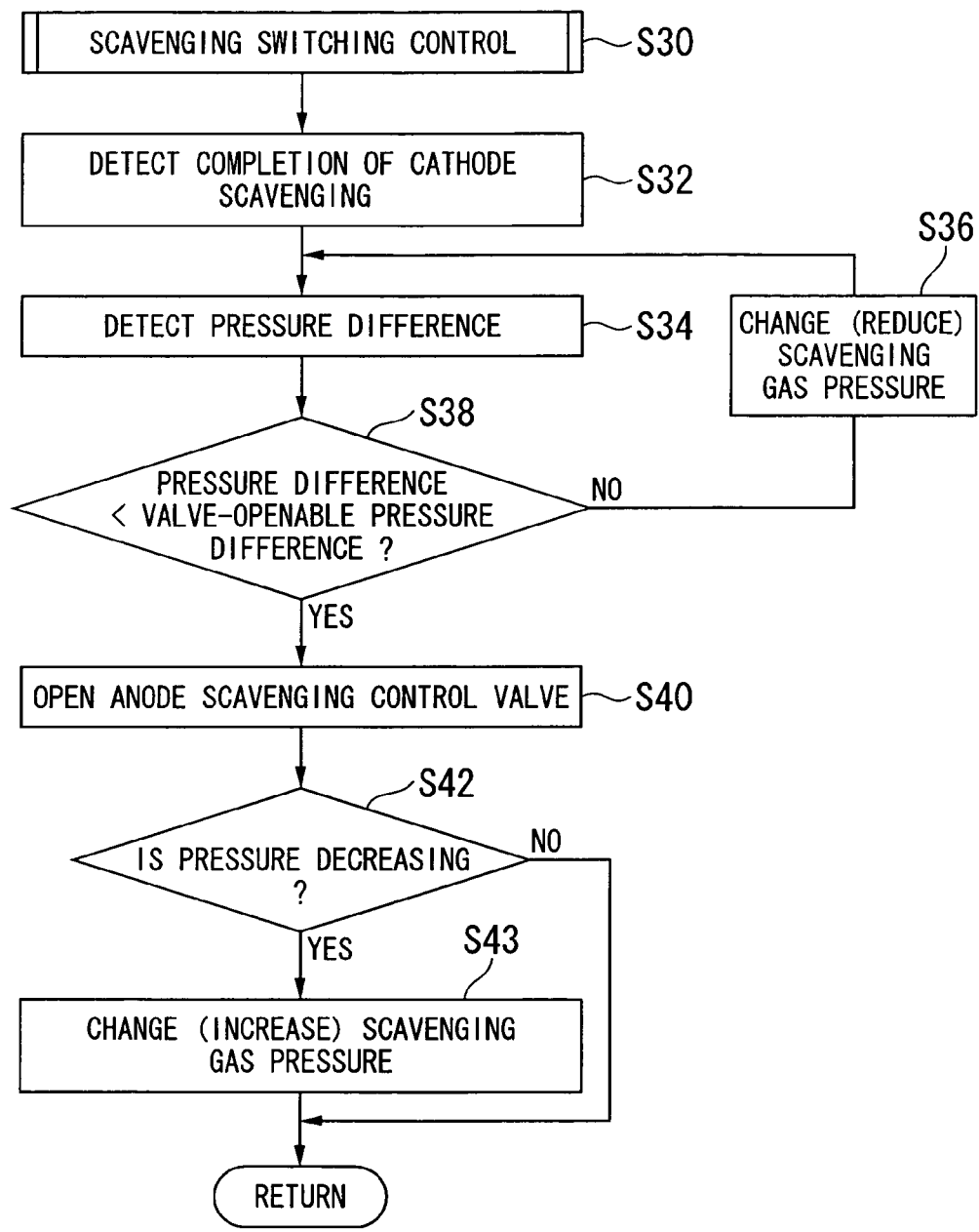
FIG. 9 is a flowchart of the scavenging switching control subroutine.

FIG. 9 is a flowchart of the scavenging switching control subroutine. When the completion of the cathode scavenging has been detected in step S32, the pressure difference of the scavenging gas between the two sides of the discharge valve 64 is measured (see step S34). Specifically, the difference between the scavenging gas pressure measured by the first pressure sensor 66 and the scavenging gas pressure measured by the second pressure sensor 67 is determined. In the next step S38, it is determined whether the measured pressure difference is smaller than a specific valve-openable pressure difference. As described above, the electromagnetic valve for forming the discharge valve 64 performs the valve-opening operation by energizing a solenoid and moving a plunger. However, when the pressure difference between both sides of the electromagnetic valve is large, it is difficult to move the plunger, and thus open the valve. The valve-openable pressure difference is a pressure difference between the two sides of the electromagnetic valve, by which the plunger can be moved by means of the energization, and the valve can be opened.

When the result of the determination in step S38 is "NO" (i.e., the measured pressure difference is relatively large), the operation proceeds to step S36, where the pressure of the scavenging gas is reduced. Specifically, as shown in FIG. 6, the degree of opening of the back pressure valve 104 is increased in response to a command from the ECU 60, so as to reduce the pressure of the scavenging gas to the command value.

Returning to FIG. 9, when the result of the determination in step S38 is "YES" (i.e., the measured pressure difference is relatively small), the operation proceeds to step S40, where the anode scavenging control valve is opened. Specifically, as shown in FIG. 6, the open state of the back pressure valve 104 is maintained, and a valve-open command is issued to the discharge valve 64. With respect to the discharge valve 64, the valve-open determination is set to an on-state (i.e., it is determined that the valve should be opened) when a predetermined time has elapsed from the output of the valve-open command to when the pressure of the scavenging gas has stabilized. Accordingly, the process of opening the discharge valve 64 is complete.

Again returning to FIG. 9, in step S42, it is determined whether or not the pressure of the scavenging gas is decreasing. As described above, the back pressure valve 104 has been opened and thus the pressure of the scavenging gas is decreasing, the operation proceeds to step S43, where the pressure of the scavenging gas is again increased. More specifically, as shown in FIG. 6, the degree of opening of the back pressure valve 104 is reduced so that the valve is totally closed. In the actual control, when the degree of opening of the back pressure valve 104 is very small, it is regarded that the back pressure valve 104 is totally closed. Accordingly, the flow of the scavenging gas through the cathode scavenging gas passage is stopped. The scavenging switching control shown in FIG. 9 is now complete.

Returning to FIG. 8, in step S44, anode scavenging is started. Specifically, the scavenging gas having a predetermined pressure flows through the anode scavenging gas passage 65 (i.e., the scavenging gas supply passage 61, the fuel gas supply piping 113, the anode gas passage 51, the anode off-gas collection piping 111, and the scavenging gas discharge passage 63), thereby scavenging the anode. In the anode scavenging, the remaining water in the anode gas passage 51 is discharged together with the scavenging gas.

In the next step S46, it is determined whether or not the anode scavenging has been completed. Here, it is determined that the anode scavenging has been completed when the process of discharging the remaining water in the anode gas passage 51 is complete. More specifically, it is determined whether or not the anode scavenging time (i.e., the time period during which the anode has been scavenged) exceeds a predetermined value necessary for completing the process of discharging the remaining water. When the result of the determination in step S46 is "NO" (i.e., the anode scavenging is not complete), the anode scavenging continues. When the result of the determination in step S46 is "YES" (i.e., the anode scavenging is complete), the operation proceeds to step S48, where the supply of the scavenging gas is stopped. The operation then returns to FIG. 7, and the scavenging is completed.

As explained in detail above, the fuel cell system of the first embodiment has the compressor 102 for supplying the scavenging gas to the fuel cell stack 1, the discharge valve 64 for performing switching between the cathode scavenging and the anode scavenging, the back pressure valve 104 for controlling the pressure of the scavenging gas, and the ECU 60 for controlling the operations of the compressor 102, the discharge valve 64, and the back pressure valve 104. The ECU 60 controls the pressure of the scavenging gas by using the back pressure valve 104, so that when the scavenging is switched from the cathode scavenging to the anode scavenging via the discharge valve 64, the pressure of the scavenging gas at the upstream side with respect to the discharge valve 64 is reduced to a level lower than the pressure of the scavenging gas during the cathode scavenging.

In accordance with the above structure, when the scavenging is switched from the cathode scavenging to the anode scavenging, the pressure of the scavenging gas at the upstream side with respect to the discharge valve 64 is reduced, so that the pressure difference between the two sides of the discharge valve 64 is reduced. More specifically, it is possible to reduce the pressure difference between the two sides of the discharge valve 64 to the above-described valve-openable pressure difference. Therefore, the force necessary for opening the discharge valve 64 can be reduced, thereby allowing reliable opening of the discharge valve 64, and also reducing the size and cost of the discharge valve 64.

In addition, the discharge valve 64, arranged at the downstream side of the anode gas passage 51, is used as the scavenging switching valve. Therefore, even during the cathode scavenging, the anode gas passage 51 communicates with the cathode gas passage 52. So, during the cathode scavenging, the scavenging gas supplied to the cathode gas passage 52 can be drawn into the anode gas passage 51, so as to dilute the hydrogen gas remaining in the anode gas passage 51. Accordingly, it is possible to reduce the concentration of the hydrogen gas included in the discharge gas during the anode scavenging.

In the above embodiment, the back pressure valve 104 functions as the scavenging gas pressure control device. However, the compressor 102 may also function as the scavenging gas pressure control device. In this case, pressure control is performed by varying the rotation speed, which may make the user feel uncomfortable due to a variation in the noise which is generated during the scavenging. In the above embodiment in which the back pressure valve 104 functions as the scavenging gas pressure control device, it is possible to reduce user discomfort caused by variation in the noise generated during the scavenging.

First Variation

Figure 10A:
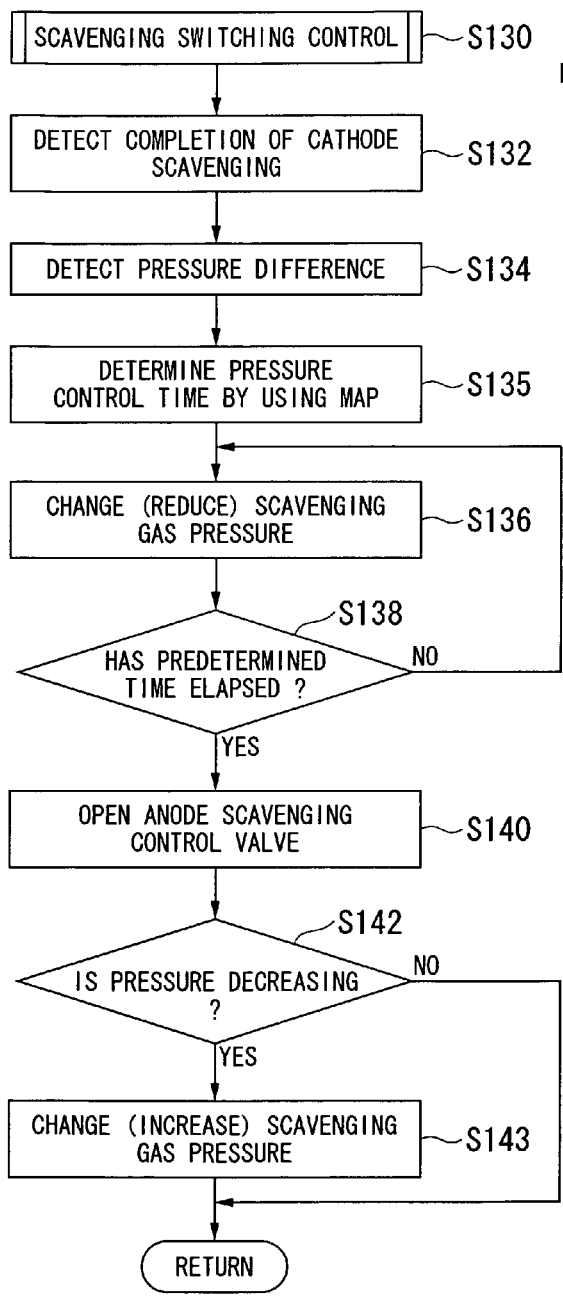
FIG. 10A is a flowchart of the scavenging switching control subroutine in a first variation of the first embodiment.

FIG. 10A is a flowchart of the scavenging switching control subroutine in a first variation of the first embodiment.

In the first embodiment, the discharge valve 64 is opened after the pressure difference between both sides of the discharge valve 64 becomes lower than a predetermined value. However, in the first variation, the discharge valve 64 is opened after the pressure difference between both sides of the discharge valve 64 is controlled for a predetermined amount of time. Below, a detailed explanation is omitted for parts identical or similar to the corresponding parts in the first embodiment.

In the scavenging switching control of the first variation shown in FIG. 10A, when the completion of the cathode scavenging is detected (see step S132), the pressure difference between the two sides of the discharge valve 64 is measured in step S134. In the next step S135, a pressure control time is determined using a map.

Figure 10B:
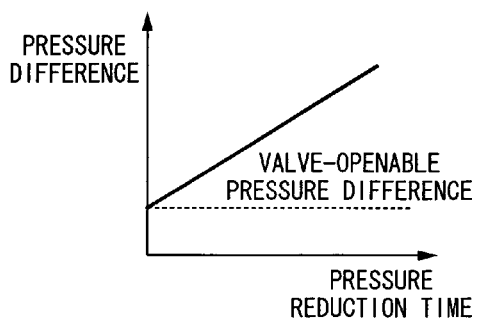
FIG. 10B shows a map used for determining the pressure control time.

FIG. 10B shows a map used for determining the pressure control time. In this map, the vertical axis indicates the pressure difference between both sides of the discharge valve 64, and the horizontal axis indicates the pressure control time (i.e., pressure reduction time). In the pressure control of the scavenging gas, the pressure difference between both sides of the discharge valve 64 is reduced to the valve-openable pressure difference of the discharge valve 64. Therefore, in FIG. 10B, when the pressure difference coincides with the valve-openable pressure difference, the pressure control time is zero. As the pressure difference becomes further higher than the valve-openable pressure difference, the pressure control time is further increased.

Returning to FIG. 10A, the pressure of the scavenging gas is reduced in step S136. More specifically, the degree of opening of the back pressure valve 104 is increased by means of a command from the ECU 60. In the next step S138, it is determined whether a predetermined time has elapsed from the start of reducing the pressure of the scavenging gas. This predetermined time is the pressure control time determined in the above step S135. When the result of the determination in step S138 is "NO" (i.e., the predetermined time has not elapsed), the operation returns to step S136 so as to continue the pressure reducing operation. When the result of the determination in step S138 is "YES" (i.e., the predetermined time has elapsed), it is estimated that the pressure difference between both sides of the discharge valve 64 has become lower than the valve-openable pressure difference, and thus the process of opening the discharge valve 64 is performed.

Also in accordance with the above-described first variation, the pressure difference between both sides of the discharge valve 64 can be reduced to the valve-openable pressure difference. Therefore, the force necessary for opening the discharge valve 64 can be reduced, thereby allowing reliable opening of the discharge valve 64, and also reducing the size and cost of the discharge valve 64.

Second Embodiment

Figure 11:
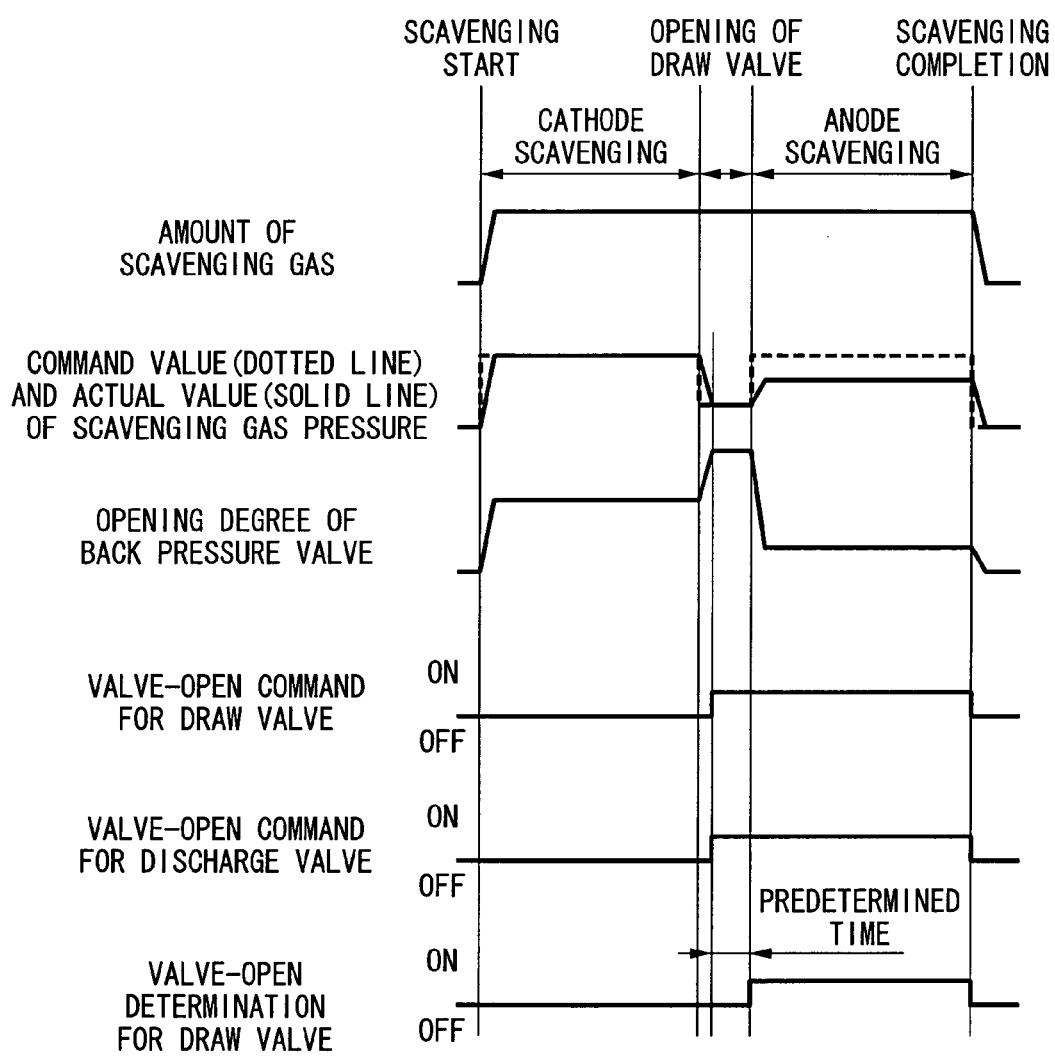
FIG. 11 is a timing chart with respect to the scavenging method of the fuel cell system in a second embodiment in accordance with the present invention.

FIG. 11 is a timing chart with respect to the scavenging method of the fuel cell system in a second embodiment in accordance with the present invention. In the above first embodiment, the discharge valve 64 functions as the scavenging switching valve. However, in the second embodiment, the draw valve 62 functions as the scavenging switching valve. Below, a detailed explanation is omitted for parts identical or similar to the corresponding parts in the first embodiment.

In the cathode scavenging process of the second embodiment, no valve-open command is issued for either of the draw valve 62 or the discharge valve 64. After completion of the cathode scavenging, the degree of opening of the back pressure valve 104 is increased so as to reduce the pressure of the scavenging gas. When the pressure difference between both sides of the draw valve 62 becomes lower than the valve-openable pressure difference, the valve-open command is issued from the ECU 60 to both the draw valve 62 and the discharge valve 64 while the open state of the back pressure valve 104 is maintained. With respect to the draw valve 62, the valve-open determination is set to an on-state when a predetermined time has elapsed from the output of the valve-open command to when the pressure of the scavenging gas has stabilized. Accordingly, the process of opening the draw valve 62 (and the discharge valve 64) has been completed.

After that, the degree of opening of the back pressure valve 104 is decreased so as to totally close the back pressure valve 104, thereby stopping the flow of the scavenging gas through the cathode scavenging gas passage. Here, as the draw valve 62 and the discharge valve 64 are open, the scavenging gas is drawn into the anode scavenging gas passage 65, thereby performing the anode scavenging.

Also in the second embodiment, it is possible to reduce the pressure difference between both sides of the draw valve 62 to the valve-openable pressure difference, thereby reducing the force necessary for opening the draw valve 62, and reducing the size and cost of the draw valve 62.

Third Embodiment

Figure 12:
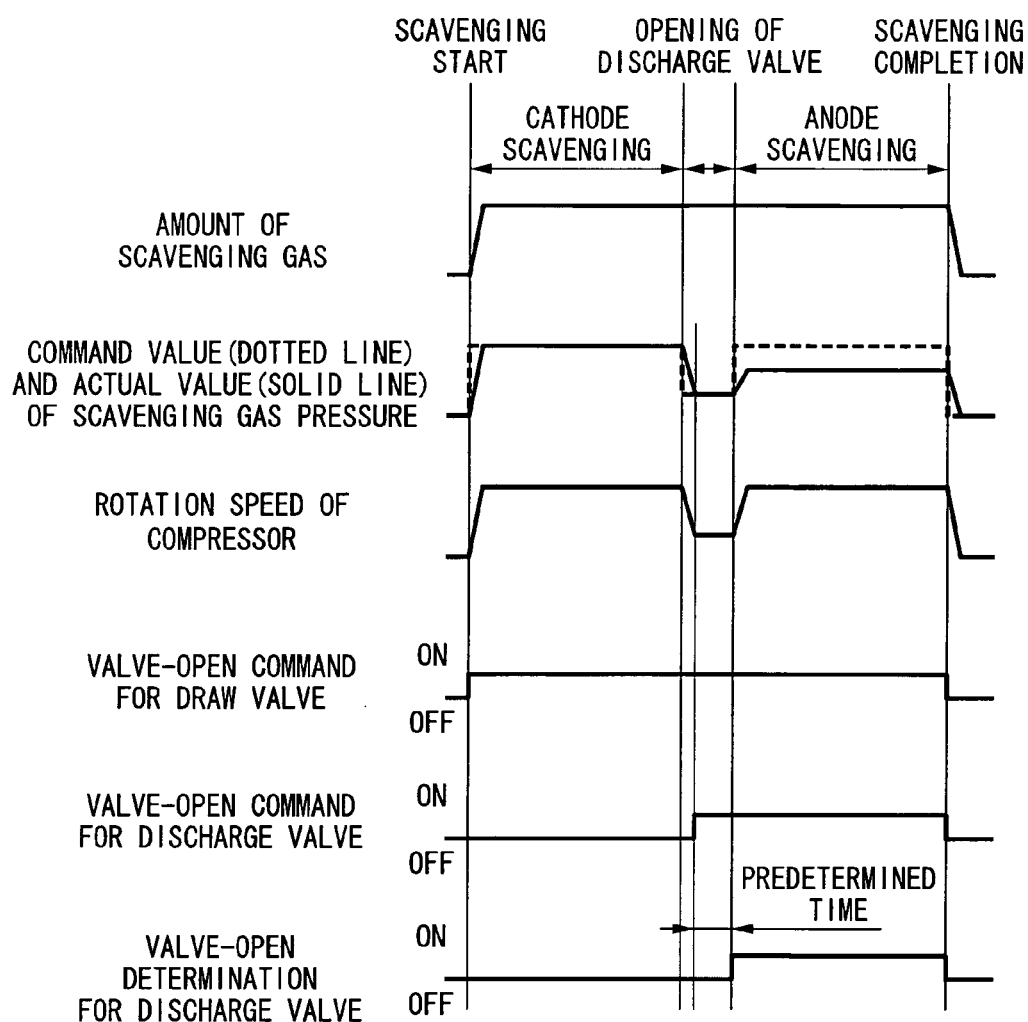
FIG. 12 is a timing chart with respect to the scavenging method of the fuel cell system in a third embodiment in accordance with the present invention.

FIG. 12 is a timing chart with respect to the scavenging method of the fuel cell system in a third embodiment in accordance with the present invention. In the above first embodiment, the back pressure valve 104 functions as the scavenging gas pressure control device. However, in the third embodiment, the compressor 102 functions as the scavenging gas pressure control device. Below, a detailed explanation is omitted for parts identical or similar to the corresponding parts in the first embodiment.

In the cathode scavenging process, the valve-open command is issued to the draw valve 62, but not issued to the discharge valve 64. In the third embodiment, after completion of the cathode scavenging, the rotation speed of the compressor 102 is decreased so as to reduce the pressure of the scavenging gas. When the pressure difference between both sides of the discharge valve 64 becomes lower than the valve-openable pressure difference, the valve-open command is issued from the ECU 60 to the discharge valve 64 while the present low rotation speed of the compressor 102 is maintained. With respect to the discharge valve 64, the valve-open determination is set to an on-state when a predetermined time has elapsed from the output of the valve-open command to when the pressure of the scavenging gas has stabilized. Accordingly, the process of opening the discharge valve 64 has been completed.

After that, the back pressure valve 104 is totally closed, so as to stop the flow of the scavenging gas through the cathode scavenging gas passage. In addition, the rotation speed of the compressor 102 is increased so that the scavenging gas is drawn into the anode scavenging gas passage 65, thereby performing the anode scavenging.

Also in the third embodiment in which the compressor 102 functions as the scavenging gas pressure control device, it is possible to reduce the pressure difference between both sides of the discharge valve 64 to the valve-openable pressure difference, thereby reducing the force necessary for opening the discharge valve 64, and reducing the size and cost of the discharge valve 64.

While preferred embodiments of the invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, in the above embodiments, the scavenging gas is the cathode gas (i.e., oxidant gas or air), and the scavenging gas supply device is the compressor 102. However, the scavenging gas may be a nitrogen gas, and the scavenging gas supply device may be a nitrogen tank, which is additionally provided. In addition, the positions of the first pressure sensor 66 and the second pressure sensor 67 are not limited to those in the above embodiments, and other positions are possible by which specific objectives (of the sensors) can be achieved.

What is claimed is:

1. A scavenging method of a fuel cell system, wherein:
   the fuel cell system includes:
   a fuel cell stack in which a cathode gas and an anode gas are respectively supplied to a cathode gas passage and an anode gas passage so as to generate electric power;
   a scavenging gas supply device for supplying a scavenging gas to the fuel cell stack; and
   a scavenging switching valve for performing switching between first scavenging for performing scavenging by supplying the scavenging gas to the cathode gas passage, and second scavenging for performing scavenging by supplying the scavenging gas to the anode gas passage; and
   the method comprises the steps of:
   performing the first scavenging;
   controlling the pressure of the scavenging gas by making the pressure of the scavenging gas at the upstream side with respect to the scavenging switching valve be lower than the pressure of the scavenging gas during the first scavenging; and
   switching the scavenging switching valve after the pressure of the scavenging gas at the upstream side with respect to the scavenging switching valve is lower than the pressure of the scavenging gas during the first scavenging.

2. The scavenging method in accordance with claim 1, further comprising the step of:
   measuring pressure difference between the upstream and downstream sides with respect to the scavenging switching valve, wherein:
   the step of controlling the pressure of the scavenging gas includes reducing the pressure of the scavenging gas until the measured pressure difference becomes lower than a predetermined value.

3. The scavenging method in accordance with claim 1, wherein:
   the step of controlling the pressure of the scavenging gas includes reducing the pressure of the scavenging gas until a predetermined time has elapsed.

4. The scavenging method in accordance with claim 1, wherein:
   in the first scavenging during which the anode gas passage is not scavenged, the scavenging gas is drawn into the anode gas passage.

* * * * *